United States Patent
Dance et al.

(10) Patent No.: US 6,463,220 B1
(45) Date of Patent: Oct. 8, 2002

(54) METHOD AND APPARATUS FOR INDICATING A FIELD OF VIEW FOR A DOCUMENT CAMERA

(75) Inventors: Christopher R. Dance, Trumpington (GB); Mauritius Seeger, Royston (GB)

(73) Assignee: Xerox Corporation, Stamford, CT (US)

(*) Notice: Subject to any disclaimer, the term of this patent is extended or adjusted under 35 U.S.C. 154(b) by 10 days.

(21) Appl. No.: 09/707,930

(22) Filed: Nov. 8, 2000

(51) Int. Cl.[7] .............................................. G03B 17/48
(52) U.S. Cl. ........................ 396/431; 348/207; 348/358
(58) Field of Search ................................ 348/207, 209, 348/358, 370; 396/431; 358/93, 110, 210

(56) References Cited

U.S. PATENT DOCUMENTS

| | | | |
|---|---|---|---|
| 5,189,463 A | 2/1993 | Capper et al. | 354/403 |
| 5,485,235 A | 1/1996 | Meyers | 354/165 |
| 5,500,702 A | 3/1996 | Meyers | 354/165 |
| 5,543,889 A | 8/1996 | McIntyre | 354/432 |
| 5,546,156 A | 8/1996 | McIntyre | 354/400 |
| 5,589,905 A | 12/1996 | McIntyre | 396/431 |
| 5,628,034 A | 5/1997 | McIntyre | 396/52 |
| 5,650,817 A * | 7/1997 | Jae-chon | 348/207 |
| 5,666,577 A | 9/1997 | McIntyre et al. | 396/296 |
| 5,835,241 A | 11/1998 | Saund | 358/488 |
| 5,892,543 A | 4/1999 | Zheng et al. | 348/347 |
| 6,067,112 A | 5/2000 | Wellner et al. | 348/211 |

FOREIGN PATENT DOCUMENTS

GB    2 252 836 A    8/1992

OTHER PUBLICATIONS

K. Kise, A. Sato and K. Matsumoto, "Document Image Segmentation as Selection of Voronoi Edges", in Proc. Workshop on Document Image Analysis, Eds. L. Vincent and G. Kopec, San Juan, Jun. 1997, pp. 32–39.

Doncescu A. et al, "Former Books Digital Processing: Image Warping", Proc. Workshop on Document Image Analysis, San Juan, Puerto Rico, Jun. 20, 1997, Eds. L. Vincent & G. E. Kopec.

* cited by examiner

Primary Examiner—David M. Gray (57) ABSTRACT

A document camera is described for capturing an electronic image of a document, for subsequent optical character recognition. In order to avoid the need for a user to look through a viewfinder of the camera, the camera comprises a projector for projecting an optical field of view indicator on to the document. The user can see the projected indicator on the document page, indicating the effective field of view of the camera. The camera may include auto-focus and zooming mechanisms. In one form, the camera processes a detected image to determine a capture zone corresponding to whole regions of the document falling entirely within the field of view. The projected indicator is controlled to indicate only the capture zone. When the image is to be captured, the camera zooms in to the capture zone to capture the image at maximum resolution.

20 Claims, 6 Drawing Sheets

METHOD AND APPARATUS FOR INDICATING A FIELD OF VIEW FOR A DOCUMENT CAMERA

BACKGROUND OF THE INVENTION

1. Field of the Invention

The present invention relates to the field of document cameras, and in particular to indicating an effective field of view for a document camera. The invention is especially suitable for portable (e.g. handheld) document cameras.

2. Description of Related Art

A document camera is defined herein as a digital camera having a digital resolution sufficient to enable processing of a captured document image by an optical character recognition (OCR) algorithm. The resolution is therefore equivalent to at least 100 dpi (dots per inch) of the original document.

For capturing an image of a page, for example, lying flat on a table, most digital cameras are designed for capture while a user is standing, and require the user to look through a viewfinder to select the field of view. It is therefore awkward for a seated user to look through a viewfinder to capture a page, as this requires an unnatural leaning posture to look down on to the page. It can also be awkward for people who wear glasses.

Although some digital cameras provide a display for visual feedback, this increases the cost of the camera, and is usually fixed on the back of the camera, which again makes it hard to use for a seated user. Some cameras have a foldout video display. However, these can make hand-eye co-ordination awkward, as the view co-ordinate system is not the same as the user's view co-ordinate system. Furthermore, all electronic displays require that the camera be kept in focus while the user moves it, in order to provide satisfactory visual feedback.

A further problem with electronic displays is that, if a user wishes to capture a small section of a document in a zoomed mode, he must work out exactly where his current view of the document is in relation to the area he wishes to acquire.

It has been suggested in the field of general cameras, to provide a camera with a projector for projecting a light source on to the scene to be captured, the light source providing boundary markers indicative of the field of view. This can remove the need for a user to look through a viewfinder, as the field of view is indicated in the object scene. The light source may, for example, be a semiconductor laser. Reference is made to U.S. Pat. Nos. 5,589,905; 5,500,702 and 5,485,235, the contents of which are incorporated herein by reference. However, these arrangements are not directed at document cameras and do not address any of the problems specific to this field of image capture.

Further reference may be made to U.S. Pat. Nos. 5,189,463; 5,628,034; 5,546,156; 5,543,889; 5,666,577 and 5,835,241, and to UK Patent Application GB-A-2252836. The contents of these documents are also incorporated herein by reference.

SUMMARY OF THE INVENTION

It would be desirable to provide a document camera which can be used more conveniently by a seated user, without the need for a viewfinder.

It would also be desirable to indicate variable fields of view for a document-imaging camera.

Broadly speaking, a first aspect of the present invention is to provide a document camera with a projector for projecting an indicator onto an object scene to be captured, the indicator indicating the field of view of the camera.

This can enable the operator to view the field of view on the document itself, without having to look through a camera viewfinder, which might be inconvenient.

In a preferred form, the projector is operable to project the field of view indicator to have a variable size and/or position. The camera includes a controller for controlling the size and/or position of the projected field of view indicator, to vary the field of view of the camera.

In a particularly preferred form, the camera comprises an image processor to process an at least partly captured image to detect an optimum capture zone for the document. The capture zone corresponds to whole sections or regions of the document which fall entirely within the available field of view of the camera. Any sections which are not entirely within the available field of view are deemed not to be included in the captured image, and the projected field of view indicator is controlled to indicate only the capture zone. When the image is to be captured, the camera zooms in to capture the image region corresponding to the capture zone at maximum (or at least an increased) resolution.

BRIEF DESCRIPTION OF THE DRAWINGS

Embodiments of the invention are now described by way of example only, with reference to the accompanying drawings, in which.

DETAILED DESCRIPTION

Figure 1:
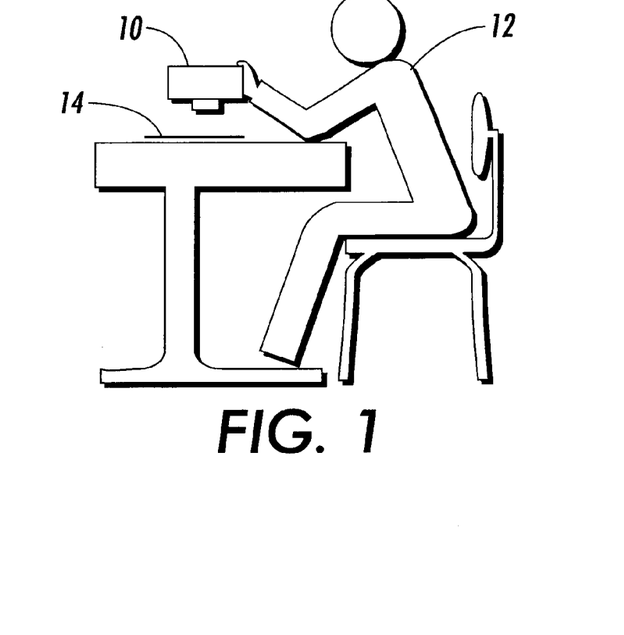
FIG. 1 is a schematic diagram showing a seated user photographing a document.
Figure 2:
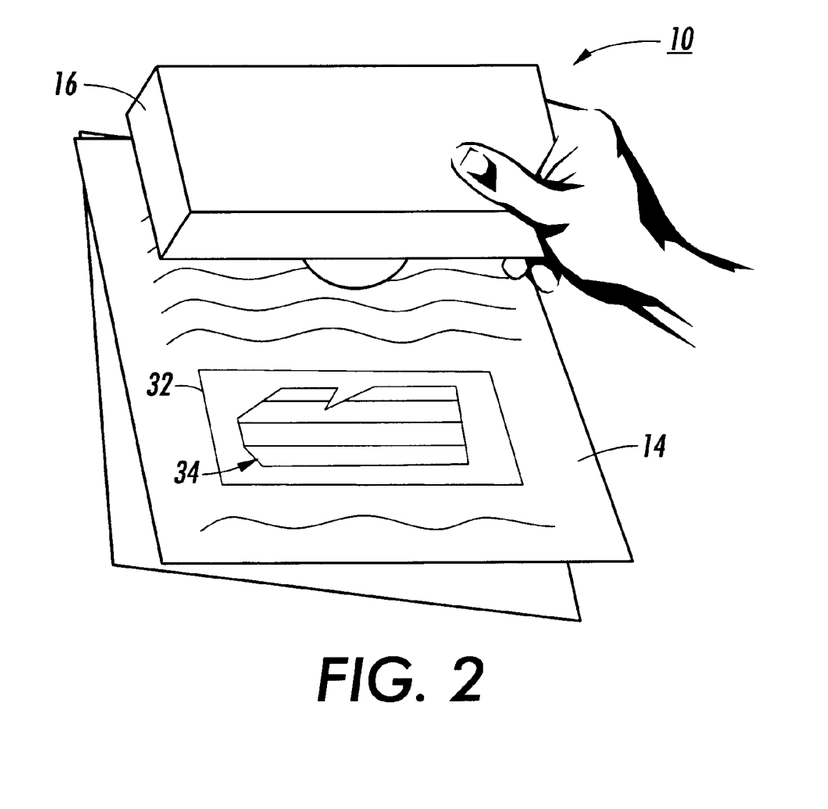
FIG. 2 is a schematic perspective view similar to FIG. 1 showing a first embodiment of the invention.
Figure 3:
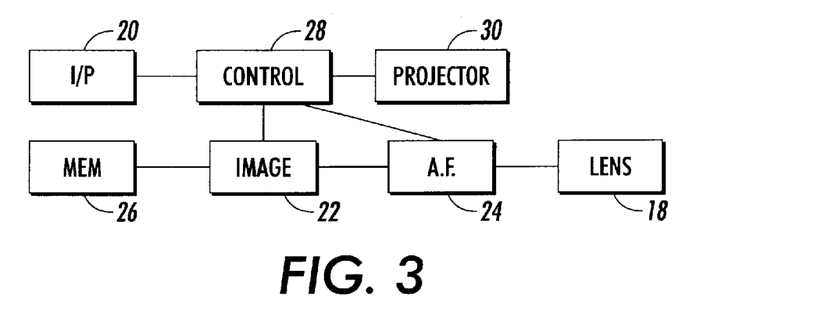
FIG. 3 is a schematic block diagram of the camera of the first embodiment.

Referring to FIGS. 1–3, a document camera 10 is described for enabling a user 12 to capture an image of a document 14 while seated, without requiring the user to look through a viewfinder lens of the camera 10.

The document camera 10 consists of a housing 16, carrying an objective lens 18, one or more operation buttons 20 for controlling operation of the camera. Within the camera 10 are a photoelectric detector 22 for capturing an image, an auto-focus mechanism 24 for ensuring that the captured image is sharply focused, to be suitable for subsequent OCR, and a storage medium 26 for storing the captured image. The construction of such elements is well known to camera constructors, and so need not be described here in detail. The camera operates under the control of a controller 28.

The camera 10 also carries an optical projector 30 for projecting a field of view indicator 32 onto the subject field, namely the document 14 to be captured. The field of view indicator 32 is visible on the document itself (FIG. 2) which obviates the need for the user to have to view the document through the camera viewfinder, and enables the user to position the camera correctly to capture the desired page or other region of document image. For example, in FIG. 2, the camera is positioned such that the text 34 towards the lower half of the document 14 is encompassed by the camera's field of view.

The field of view indicator 32 may take a number of different forms, for example, markers indicating the frame corners, or dotted lines, or a grid, or illumination of an entire region. In the present embodiment, a rectangular boundary line is preferred as a clear, unambiguous indication of the field of view boundaries. However, in a modified embodiment described later, a grid indicator is preferred.

Any suitable projector 30 may be used to project the field of view indicator 26. Suitable constructions are described herein later.

In the first embodiment, the camera 10 has a fixed field of view, namely a fixed angle of view. When the camera 10 is put in a mode suitable for document imaging, the controller 28 controls the projector 30 to project the field of view indicator 32. The desired region to be captured is adjusted by physically moving the camera 10 until the desired image is framed by the field of view indicator 32. When the shutter release button of the camera is depressed, the controller 28 controls the projector 30 to extinguish the field of view indicator 32. The image is captured by the photo detector 24 and transferred to the storage medium 26.

Figure 4:
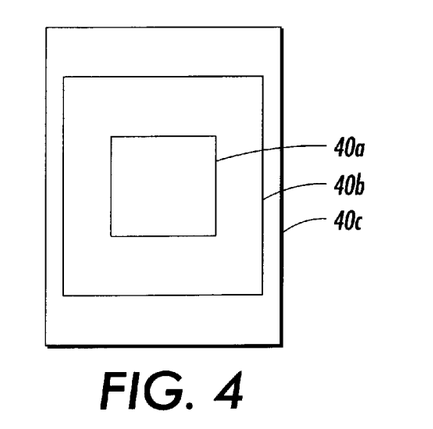
FIG. 4 is a schematic illustration of page zones in a second embodiment of the invention.
Figure 5:
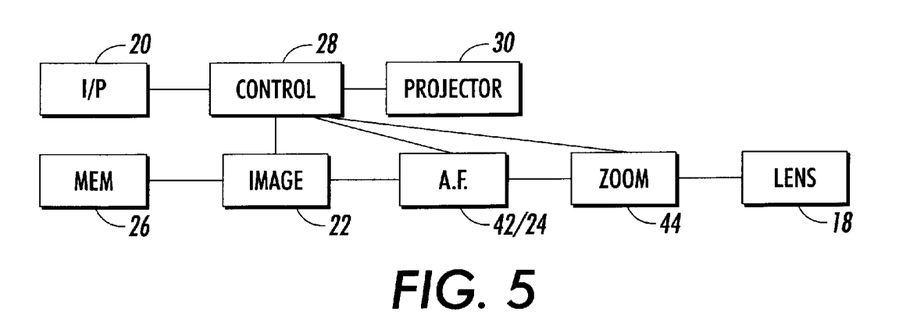
FIG. 5 is a schematic block diagram of the camera of the second embodiment.

Referring to FIGS. 4 and 5, a second embodiment of the camera is now described. The same reference numerals are used where appropriate to indicate the equivalent features in this embodiment. The second embodiment is similar to the first embodiment, except that the camera has a plurality of different, predetermined fields of view, indicated as zones 40a, 40b and 40c. These zones may correspond to predetermined page sizes or predetermined section sizes for capturing a certain section of a document. In the second embodiment, the user selects a desired size of the field of view, and the projector 30 projects the corresponding indicator 32 to frame the respective zone 40a, 40b or 40c. It will be appreciated that the size of the projected field of view indicator 32 depends on the distance of the camera 10 from the document 14. Therefore, in this embodiment, the camera comprises a distance-measuring device 42 (for example, an infra-red ranging meter which may be part of the auto-focus mechanism 24 described above) which is used to determine the distance of the document from the camera.

The projector 30 is controllable by the controller 28 to enable the size of the field of view indicator 32 to be varied. The controller 28 determines the correct size of the field of view indicator to match the predetermined zone 40a (or 40b or 40c) based on the detected distance of the document relative to the camera. Therefore, when the field of view indicator 32 is projected on the document at that distance, it will correspond to the predetermined size of the zone.

Figure 6:
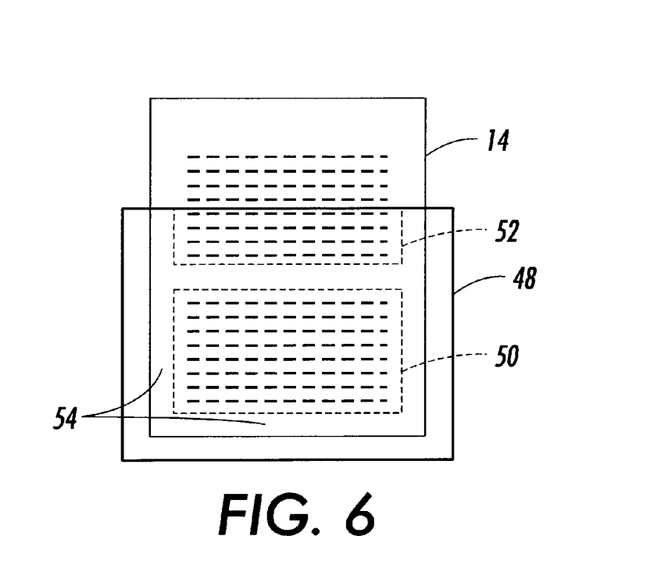
FIG. 6 is a schematic illustration of page zoning in a third embodiment of the invention.
Figure 7:
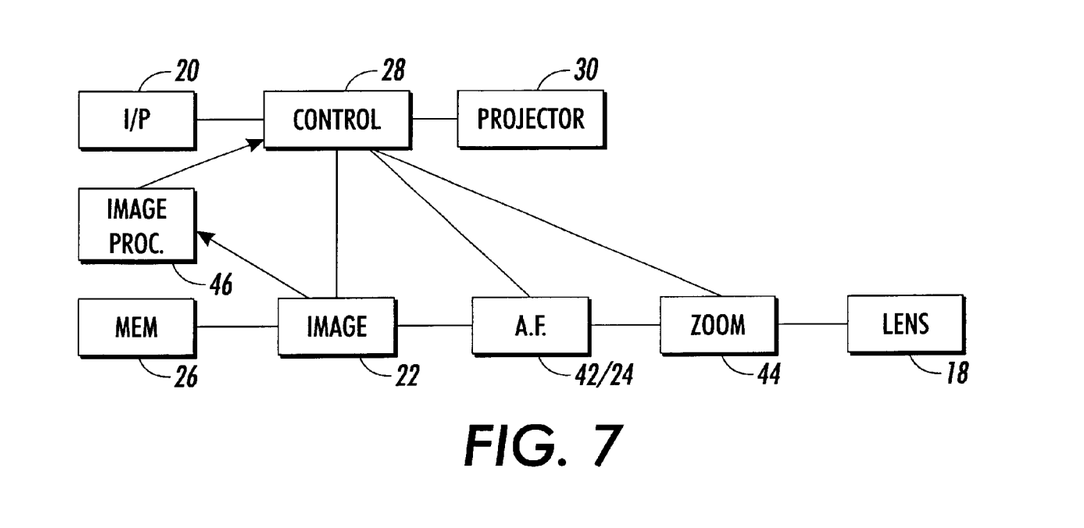
FIG. 7 is a schematic block diagram of the camera of the third embodiment.
Figure 8:
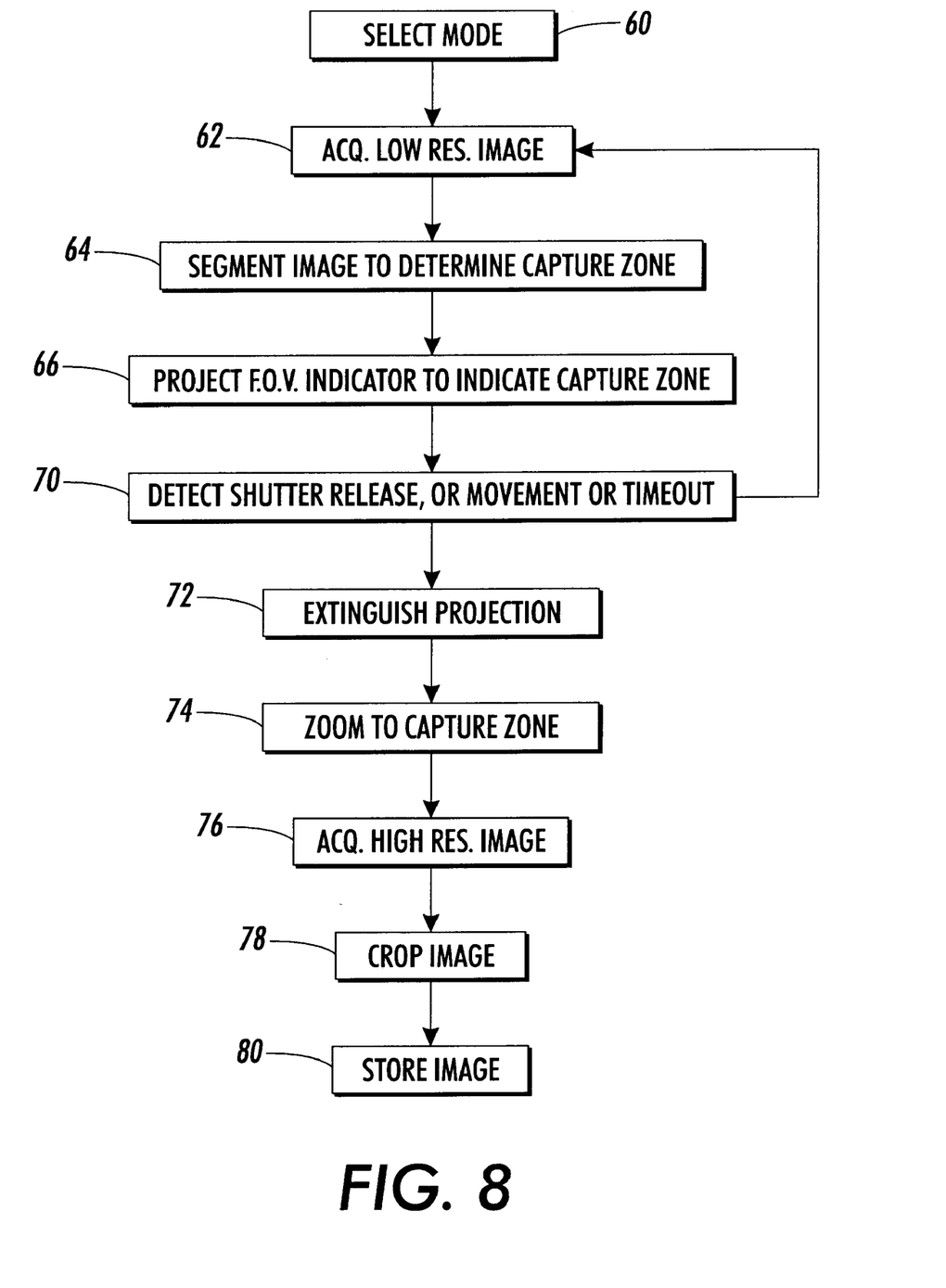
FIG. 8 is a schematic flow diagram of the operation of the third embodiment.

When the user depresses the shutter release, the camera 10 captures the image in the region indicated by the field of view indicator. If desired, the imaging region could be controlled by cropping the image after acquisition by the camera's photoelectric detector. However, in the present embodiment, the camera 10 further comprises a zoom mechanism 44 for zooming the camera lens 18 to the desired field of view. This can enable the selected region of the document to be captured at maximum resolution. It will be appreciated that the higher the resolution of the captured image, the better the image will be for subsequent processing, for example, by OCR. Referring to FIGS. 6–8, a third embodiment of the camera 10 is illustrated. Again, the same reference numerals are used where appropriate to indicate features equivalent to those described previously. In this embodiment, the camera comprises a zoom mechanism 44 as described in the second embodiment. The camera 10 further includes an image processor 46 for processing a document image to detect automatically the boundaries of complete segments or zones in the document image. The purpose of the processing device 46 is to detect which zones fall entirely within the field of view of the camera, and which zones overlap the edge of the field of view (and so extend outside the field of view).

An example of such processing is illustrated in FIG. 6, in which a field of view 48 of the camera is shown relative to a document 14. A first text image zone 50 falls entirely within the field of view 48. A second text image zone 52 falls only partly within the field of view 48. Third zones 54 are blank margin zones falling within the field of view 48. The purpose of the image processor 46 is to identify the boundary of the first zone 50, as this represents the useful document image which can be acquired within the current field of view.

The image processor 46 may use any suitable detection algorithm for detecting the first zone 50. Generally, the detection is performed using a low-resolution image within the field of view, as this is faster to process. Preferably, the detection algorithm does not assume de-skewed document pages (i.e. the document is not necessarily aligned with the rectangular field of view of the camera). Furthermore, it is preferred that the algorithm be selected to operate rapidly and reliably on images with resolutions of the order of 100 dpi.

A particularly suitable algorithm is described in K. Kise, A. Sato and K. Matsumoto, "Document Image Segmentation as Selection of Voroni Edges", in Proc. Workshop on Document Image Analysis, Eds. L. Vincent and G. Kopec, San Juan, June 1997, pages 32–39. The output from this algorithm is a collection of closed (not necessarily convex) polygonal regions that surround text blocks or figures or tables. These regions are then progressively eroded inwards so that only complete blocks or zones are covered by the field of view, and incomplete blocks are cropped.

FIG. 8 illustrates the control operation of the camera to acquire an image. Firstly, at step 60, the camera is set into an initial or default mode for analyzing an image. Next at step 62, a low-resolution image is acquired by the photoelectric detector 22. At step 64, the low resolution image is processed by the image processor 46 to identify a zone corresponding to complete blocks of text, figures or tables falling entirely within the maximum field of view of the camera (as explained with reference to FIG. 7). This is referred to as the "capture zone". At step 66, the controller 28 controls the projector 30 to project a field of view indicator 32 to frame the capture zone (i.e. the detected complete zone).

Next, at step 70, the operation pauses, and waits for the user to press the shutter release button. Alternatively, if the shutter release button is not pressed within a certain period, or if movement of the camera is detected, then the operation returns to step 62. Movement of the camera may be detected by optical changes (e.g. movement of an image), or by an accelerometer.

Once the shutter release button is depressed, the controller 28 controls the projector 30 to extinguish the field of view indicator 32 at step 72. Next, at step 74, the controller 28 controls the zoom mechanism 44 to zoom in towards the capture zone. It will be appreciated that the capture zone might be off axis, such that the zoom mechanism 44 is unable to center on the capture zone. Nevertheless, by zooming the camera lens, it is possible to capture the image at the best possible resolution for the current camera position.

At step 76, the high-resolution image is acquired from the photo detector 22 after zooming. At step 78, a cropping operation is performed to crop any regions of the image outside the capture zone. Such regions may exist, for example, if the capture zone is off axis, as mentioned above. After cropping, the image corresponds to the complete block of text from the capture zone. This image is the stored within the camera storage medium 26 at step 80.

It will be appreciated that this embodiment can provide an extremely versatile acquisition operation. The image is processed to detect which whole region of the image can be captured, and the camera is zoomed to capture only that region and at the best available resolution. If the user wishes to change the capture zone detected by the camera, then this can be done simply by moving the camera such that more or less of the document falls within the available field of view. As in the previous embodiments, the user is not required to view the document through the camera viewfinder. Instead, the field of view (or in this embodiment, the detected capture zone) is projected directly on to the document itself.

In the above embodiments, any suitable form of projector 30 may be used to project the field of view indicator 32. The light source for the projector 30 may be a laser, or an incandescent bulb, or a fluorescent bulb. A semiconductor laser source is preferred, as this is compact and can produce a relatively intense output beam.

Figure 9:
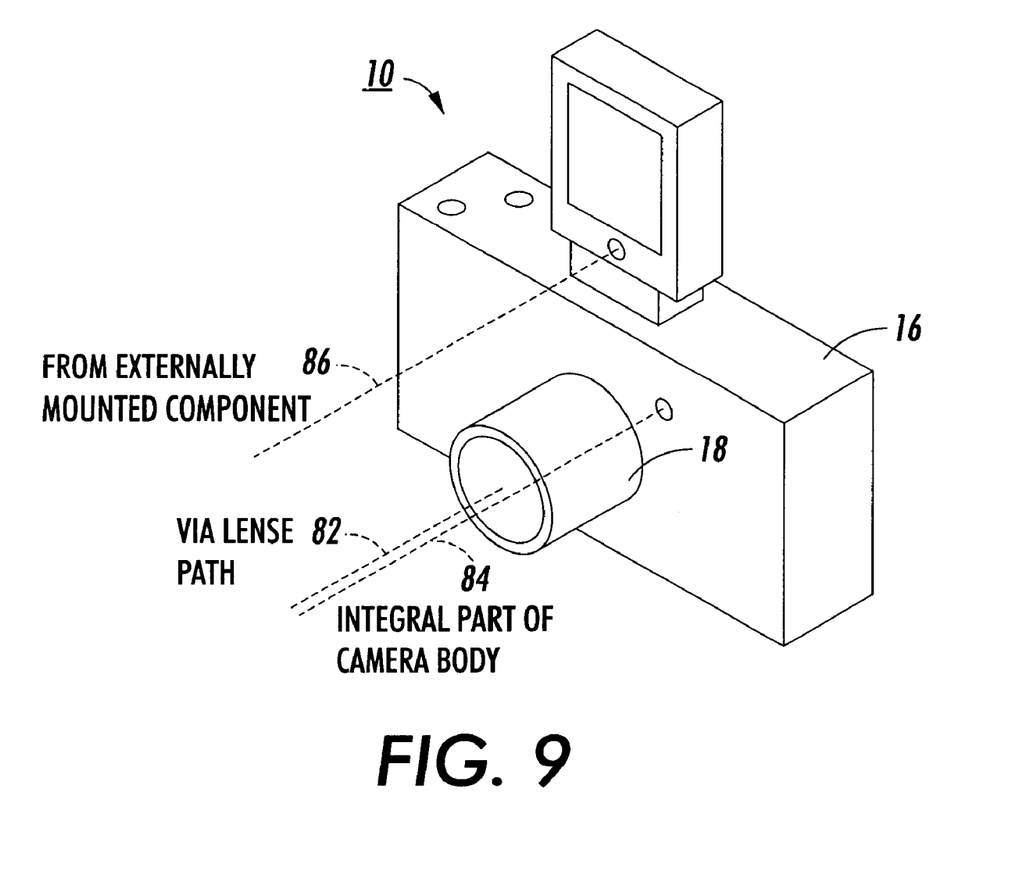
FIG. 9 is a schematic perspective view showing alternative implementations of field of view projectors.

Referring to FIG. 9, the illuminant may pass through the camera's objective lens 18 (indicated at 82) which may, for example, be the viewfinder path in an SLR (Single-Lens Reflex) camera or along the image sensor path, or in a detachable lens. This implementation has the advantage that the displayed region will always correspond to the zoom setting of the camera if a zoom mechanism (44) is used. Also, there will be no parallax between the projected image and the field of view. It also has the property that the projected indicator will be in focus when the camera is in focus. This may require constant auto-focus, but at the same time it is a useful way of providing the user with information about the state of focus when not looking through the camera viewfinder.

Alternatively, the projector could be housed in another part of the camera (indicated at 84), or housed separately from the rest of the camera, for example, on a flash holder (as indicated at 86). Such an implementation might be suitable for retrofitting to existing camera designs.

The prior patents referred to above describe various alternatives for shaping and controlling the beam, and the disclosures of those patents are incorporated herein. The illuminant could also be controlled by passing through a controllable transmissive medium (e.g. LCD), a controllable deviating medium (e.g. actuated cylinder lens) or a selectable fixed transmissive medium (e.g. a miniature photographic slide or hologram selected from a filter wheel). Alternatively, the illuminant may be reflected from rapidly moving mirrors (as in some known barcode readers) and employ persistence of vision to give the effect of a closed boundary.

In the foregoing embodiments, the projector 30 is turned off for image capture. However, further information about the object to be imaged can be acquired if an additional image acquisition is performed (before the main image capture) while the field of view indicator 32 is projected on to the object field. This is especially useful if the projector 30 is offset from the optical axis of the camera lens (i.e. the projector does not project the image through the camera lens). Suitable offset positions are the positions indicated in FIG. 9 at 84 and 86. There is then at least some degree of parallax between the projector 30 and the lens 18 which can be used to detect whether the document to be imaged is flat or is curved (i.e. curves towards or away) relative to the camera, or whether the document is skew relative to the camera. Such curvature and/or skew is important, because it causes optical distortion of the object in the captured image. This can be detected because the skew and/or curvature will also cause some degree of distortion to the field of view indicator 32 when imaged by the camera.

Figure 10:
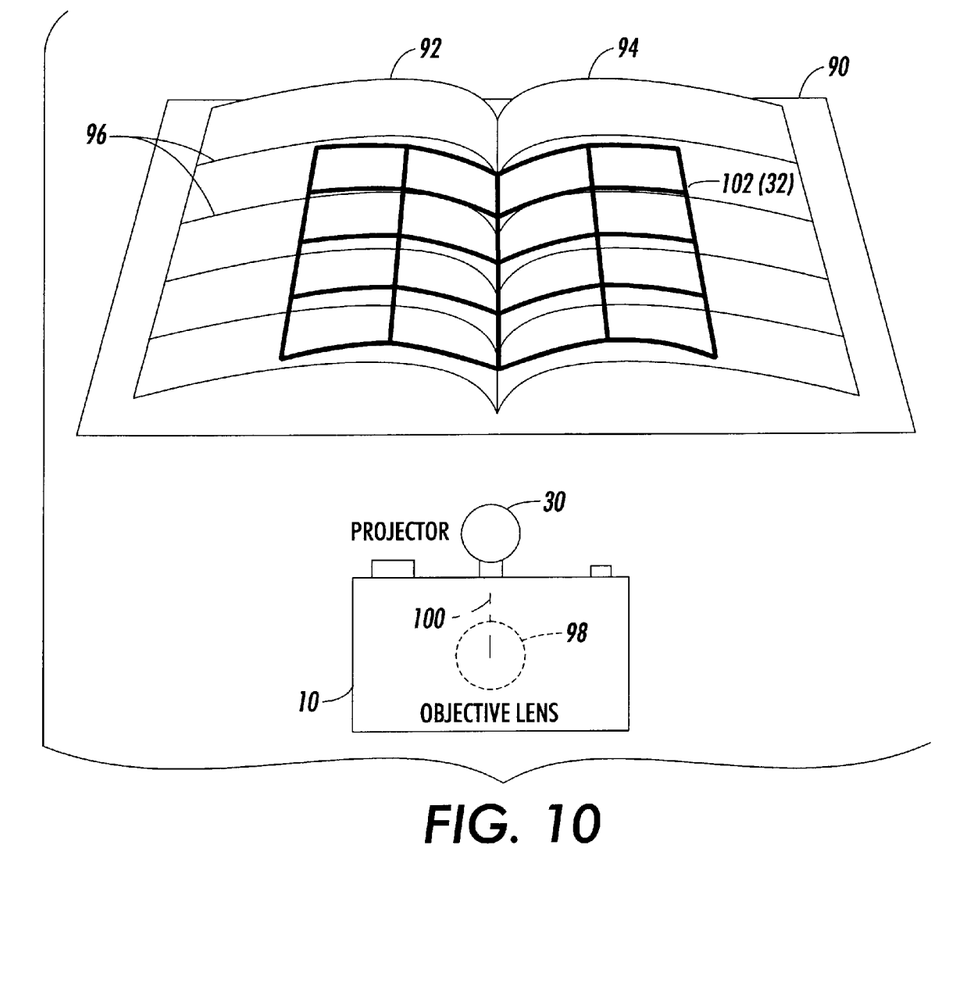
FIG. 10 is a schematic perspective view illustrating how the curvature of an object can be detected by a camera using a projected field of view indicator, to effect de-warping.

For example, FIG. 10 illustrates a book 90 opened to show two facing pages 92 and 94. The spine of the book causes the pages to have a slight curved shape (illustrated by the schematic contour lines 96). In FIG. 10, the camera is shown from behind, as seen by the person taking the picture. The projector 30 of the camera is mounted above the camera body, and is therefore offset from the objective lens 98 (and optical axis 100) of the camera. The parallax between the projector 30 and the optical axis 100 of the camera causes the appearance of the field of view indicator 32, when viewed along the optical axis 100, to be dependent on the shape of the object on which it is projected.

In the illustrated example, the field of view indicator 32 appears to be distorted by a small amount of curvature when viewed along the optical axis, as shown at 102. Therefore, by acquiring an image of the object while the field of view indicator 32 is being projected, and detecting the distortion between the known projected shape of the field of view indicator 32 and the acquired shape 102, a correction factor can be determined for "correcting" the acquired image to match the known shape. This correction factor is effectively a de-skewing and/or de-warping factor for removing distortions of the object (as well as the field of view indicator) in the image viewed by the camera.

It will be appreciated that the amount of curvature may vary spatially (as it does in FIG. 10). In this embodiment, instead of a rectangular frame shape, a rectangular grid is preferred for the field of view indicator 32, as this can provide more spatial information about curvature and skew of the page, relative to the camera.

By acquiring an image of the object illuminated by the projected grid (from a position with parallax effects), and detecting the extent to which the grid is distorted from its rectangular shape in the acquired image, a suitable correction can be generated to de-warp and de-skew the image.

More information about this type of correction technique can be found in U.S. Pat. No. 5,835,241, and also in Doncescu A. et al, "Former Books Digital Processing: Image Warping", Proc. Workshop on Document Image Analysis, San Juan, Puerto Rico, Jun. 20, 1997, Eds. L. Vincent & G. E. Kopec. The teachings of these documents are incorporated herein by reference.

The above de-skewing and/or de-warping technique may be employed in any of the foregoing embodiments. In connection with the embodiment of FIG. 9, one or more acquisitions may be made to obtain correction information. For example, it might be desirable to perform a correction acquisition prior to the determination of the "capture zone" in order to provide optimum information for the determination. Additionally or alternatively, it might be desirable to perform a correction acquisition (after zooming) just prior to the main image capture, to provide optimum correction information for the zoomed image.

It will be appreciated that the foregoing description is merely illustrative of a preferred form of the invention, and that many modifications may be made within the scope and spirit of the invention.

What is claimed is:

1. A document camera, comprising:
   a lens with a zoom mechanism;
   a photo detector for capturing a first electronic image of a document imaged by the lens;
   an image processor for processing the first electronic image of the document captured by the photo detector; the image processor determining a capture zone within the first electronic image of the document; the capture zone identifying one or more complete zones within the first electronic image of the document imaged by the lens;
   a projector for projecting a field of view indicator onto the document imaged by the tens that identifies the capture zone;
   a controller for controlling the zoom mechanism to capture a second electronic image of the capture zone identified by the field of view indicator; the second electronic image recording the capture zone with a greater resolution than the first electronic image.

2. The document camera according to claim 1, wherein the field of view indicator is in the form of a substantially closed rectangular frame.

3. The document camera according to claim 1, further comprising a distance-measuring device for measuring distance between the document and the document camera; wherein the controller determines what size to project the field of view indicator onto the document imaged by the lens to fit one of a plurality of predetermined sizes.

4. The document camera according to claim 1, wherein the image processor crops from the second electronic image content that is not part of the one or more complete zones identified in the capture zone.

5. The document camera according to claim 1, wherein each of the one or more complete zones identified in the second electronic image is one of a complete block of text, figure, or table.

6. The document camera according to claim 1, wherein the image processor de-warps and de-skews the second electronic image using a third electronic image of the document with the field of view indicator projected thereon.

7. The document camera according to claim 6, wherein the field of view indicator recorded in the third electronic image is in the form of a grid.

8. The document camera according to claim 1, wherein the field of view indicator is extinguished before capturing the second electronic image.

9. The document camera according to claim 8, further comprising a shutter release button; wherein the second electronic image is captured in response pressing the shutter release button.

10. The document camera according to claim 8, further comprising an accelerometer for detecting movement of the document camera; wherein the second electronic image is captured in response to detecting movement of the document camera by the accelerometer.

11. A method for operating a document camera with a lens with a zoom mechanism, the method comprising:
    capturing a first electronic image of a document imaged by the lens with a photo detector of the document camera;
    processing the first electronic image of the document captured by the photo detector with an image processor of the document camera; the image processor determining a capture zone within the first electronic image of the document; the capture zone identifying one or more complete zones within the first electronic image of the document imaged by the lens;
    projecting a field of view indicator onto the document imaged by the lens that identifies the capture zone;
    controlling the zoom mechanism to capture a second electronic image of the capture zone identified by the field of view indicator; the second electronic image recording the capture zone with a greater resolution than the first electronic image.

12. The method according to claim 11, further comprising moving the document camera relative to the document until the field of view indicator is aligned with a desired region to be captured.

13. The method according to claim 11, wherein the size and position of the field of view indicator are in the form of a substantially closed rectangular frame.

14. The method according to claim 11, further comprising measuring distance between the document and the document camera to determine what size to project the field of view indicator onto the document imaged by the lens to fit one of a plurality of predetermined sizes.

15. The method according to claim 11, further comprising cropping with the image processor content from the second electronic image that is not part of the one or more complete zones identified in the capture zone.

16. The method according to claim 11, wherein each of the one or more complete zones identified in the second electronic image is one of a complete block of text, figure, or table.

17. The method according to claim 11, further comprising de-warping and de-skewing the second electronic image using a third electronic image of the document with the field of view indicator projected thereon.

18. The method according to claim 17, wherein the field of view indicator recorded in the third electronic image is in the form of a grid.

19. The method according to claim 11, further comprising extinguishing the field of view indicator before capturing the second electronic image.

20. The method according to claim 19, further comprising capturing the second electronic image in response to a depressed shutter release button.

* * * * *